G. W. Scollay,
Coffin.
No. 52,756. Patented Feb. 20, 1866.
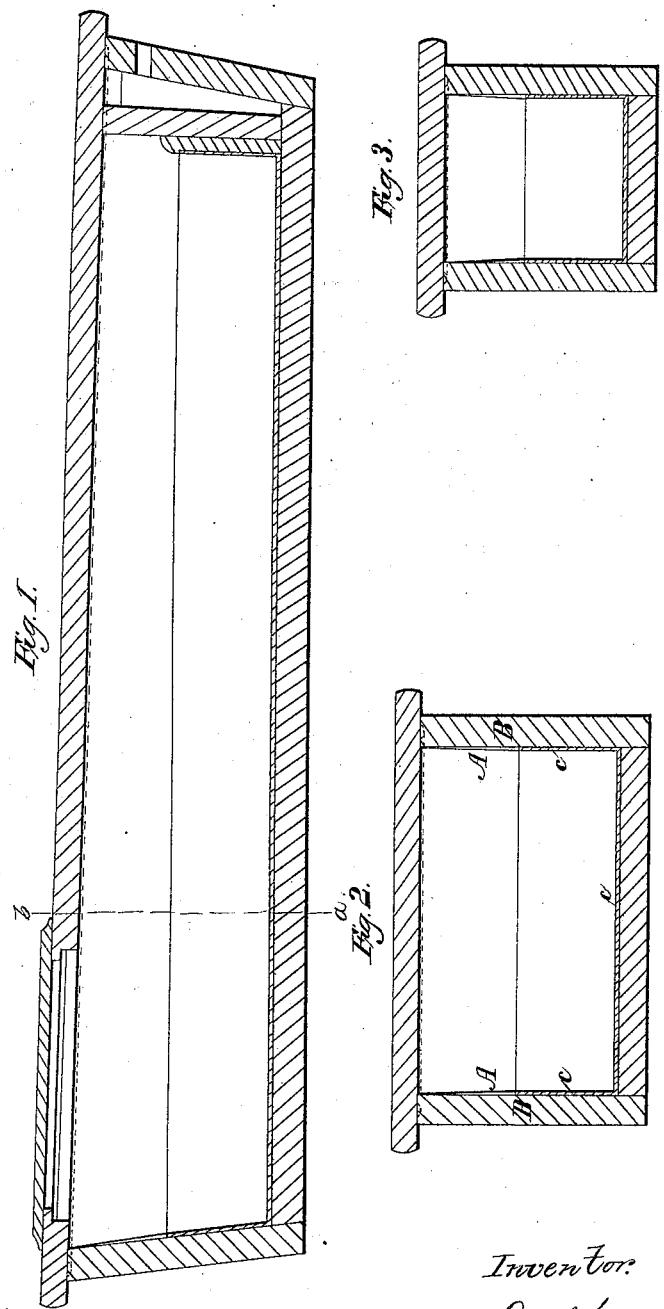
Attest:
Amos Bradway
Ed Bartlett
Inventor:
George W. Scollay

UNITED STATES PATENT OFFICE.

GEO. W. SCOLLAY, OF WASHINGTON, DISTRICT OF COLUMBIA.

IMPROVEMENT IN BURIAL-CASES.

Specification forming part of Letters Patent No. 52,756, dated February 20, 1866.

*To all whom it may concern:*

Be it known that I, GEORGE W. SCOLLAY, of Washington, in the District of Columbia, have made certain new and useful Improvements in Burial-Cases; and I do hereby declare the following to be a full, clear, and exact description of the same, reference being had to the annexed drawings, making part of this specification in which—

Figure 1 is a longitudinal section, and Figs. 2 and 3 are transverse sections through a coffin, showing my improvement applied thereto.

The object of this improvement is to further perfect the air and fluid tight burial-case. I intend more especially to apply the improvement to my air-tight deodorizing burial-case, patented to me March 18, 1862, and reissued August 19, 1862, but it is applicable to any burial-case or coffin.

The improvement consists in the application to the inside of the coffin, first, a plastic composition or cement, and then a thin metallic lining made of sheet-lead, or tin-foil, or other malleable metal readily worked into shape and applied to the inside of the coffin.

This metallic lining is made to cover the bottom and part of the sides and ends of the coffin, as shown in the drawings, A representing the composition or cement; B, the coffin, and C the sheet-metal lining, which, it will be seen, reaches about half-way up the sides and ends of the coffin, where the edges are embedded in the cement, so as to form a perfectly tight joint between it and the coffin, by which the gases and fluids are prevented from passing down between the lining and the coffin, and if there should be any imperfection in the sheet-lining, such as small holes, they would be stopped up by the cement, thus preventing the escape of gases or fluids.

When the coffin is wholly lined with sheet metal it is very difficult to make the joint tight between the coffin and its lid, and it is, moreover, much more expensive, without being in any respect any better, and in some respects not so good as the method here described, on account of the difficulty in making the joint between the lid and coffin, as above suggested.

I have hitherto used the coffin with the plastic cement coating merely, but that is objectionable on account of the difficulty in getting a cement that will neither crack in cold nor run in hot weather. If it cracks, the coffin will leak the gas and fluid generated by the decomposition of the body. If it it be made so soft as not to crack in cold weather, or so as to run in warm weather, the inside of the coffin becomes sticky and the cement runs off the sides down into the bottom of the case under the corpse, which is offensive to look upon as well as to manipulate in undertaking, and there is a further objection to the use of the cement only as a lining, and that is in its color, which is black, giving the inside of the coffin an unpleasant appearance. These objections are all avoided by the use of the metallic lining, in combination with the composition applied, as shown and described.

The object here sought after might be imperfectly obtained by making a sheet-metal lining to cover the bottom and part of the sides and ends of the coffin, and by making a tight joint between the upper edge of the sheet metal and the inside of the coffin, thus dispensing with the cement under the metal lining. Said joint might be made in a variety of ways by the use of cement, india-rubber, and the like; but I think it best to coat the whole inside of the coffin first with cement made as hard as practicable and admit of easy manipulation, and then embed the metallic lining in it.

Having now described my invention, what I claim as new, and desire to secure by Letters Patent, is—

1. In combination with the coffin and a plastic cement, the metallic lining, applied thereto for the purpose specified.

2. In combination with the coffin, a metallic sheet-lining, made to cover the bottom of the coffin and only a portion of the sides and ends thereof, and applied thereto so as to form a tight joint at the junction of the edge of the lining and the inside of the coffin, thus preventing the fluids or gases from passing down between the lining and the coffin.

GEORGE W. SCOLLAY.

Witnesses:
AMOS BROADNAX,
ED. BARTLETT.